United States Patent
Liu et al.

(10) Patent No.: US 8,098,018 B2
(45) Date of Patent: Jan. 17, 2012

(54) PULSE DIMMING CIRCUIT AND THE METHOD THEREOF

(75) Inventors: Bairen Liu, Hangzhou (CN); Lei Du, Hangzhou (CN); Yuancheng Ren, Hangzhou (CN)

(73) Assignee: Monolithic Power Systems, Inc., San Jose, CA (US)

( * ) Notice: Subject to any disclaimer, the term of this patent is extended or adjusted under 35 U.S.C. 154(b) by 327 days.

(21) Appl. No.: 12/613,286

(22) Filed: Nov. 5, 2009

(65) Prior Publication Data

US 2010/0117555 A1    May 13, 2010

(30) Foreign Application Priority Data

Nov. 12, 2008 (CN) .................. 2008 1 0046538

(51) Int. Cl.
*H05B 41/16* (2006.01)

(52) U.S. Cl. .................... 315/246; 315/291; 307/106

(58) Field of Classification Search ............... 315/246, 315/291, 299, DIG. 4; 307/106, 112
See application file for complete search history.

(56) References Cited

U.S. PATENT DOCUMENTS

| | | | |
|---|---|---|---|
| 5,528,192 A * | 6/1996 | Agiman | 327/374 |
| 6,218,788 B1 * | 4/2001 | Chen et al. | 315/225 |
| 6,239,558 B1 * | 5/2001 | Fujimura et al. | 315/307 |
| 6,396,217 B1 * | 5/2002 | Weindorf | 315/169.1 |
| 6,495,972 B1 * | 12/2002 | Okamoto et al. | 315/291 |
| 7,295,176 B2 * | 11/2007 | Yang | 345/82 |
| 7,414,371 B1 * | 8/2008 | Choi et al. | 315/291 |
| 7,800,317 B2 * | 9/2010 | Kimura | 315/307 |
| 8,018,177 B2 * | 9/2011 | Goo et al. | 315/291 |

* cited by examiner

*Primary Examiner* — Thuy Vinh Tran
(74) *Attorney, Agent, or Firm* — Perkins Coie LLP

(57) ABSTRACT

The present invention provides a pulse dimming circuit and a method thereof. The pulse dimming circuit is compatible for both DC input signal and PWM input signal using only one circuit board, and includes a first input port, a second input port, a comparison signal generator, a comparator, a logic module, and a switch network electrically coupled to the second input port, an output terminal of the comparator, and an output terminal of the logic module.

16 Claims, 8 Drawing Sheets

PULSE DIMMING CIRCUIT AND THE METHOD THEREOF

CROSS-REFERENCE TO RELATED APPLICATION(S)

This application claims the benefit of the filing date of Chinese Application Ser. No. 200810046538.0, filed on Nov. 12, 2008, and incorporated herein by reference.

TECHNICAL FIELD

The present invention relates to a pulse dimming circuit for cold cathode fluorescent lamps (CCFL) and method thereof.

BACKGROUND

Pulse dimming is usually adopted by CCFL Inverters. Generally there are two methods for pulse dimming. One method uses direct current (DC) input voltage, and the other method utilizes an external PWM input signal. For the first method, a comparison wave generator is required. By comparing a DC input signal with a reference comparison wave, a pulse dimming signal is generated. For the second method, the pulse dimming signal follows the PWM input signal directly, thus there is no need for a reference comparison wave generator. As a result, the two pulse dimming methods are not generally compatible.

For either of the two dimming methods, a separate circuit board is needed. Thus, in the prior art, two circuit boards are required, which adds to cost.

BRIEF DESCRIPTION OF THE DRAWINGS

The accompanying drawings, which are incorporated in and form a part of this specification, illustrate embodiments of the invention and, together with the description serve to explain the principles of the invention.

DETAILED DESCRIPTION

Reference will now be made in detail to different embodiments of the invention, examples of which are illustrated in the accompanying drawings. While the invention will be described in conjunction with different embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without these specific details. In other instances, well-known methods, procedures, components, and circuits have not been described in detail so as not to unnecessarily obscure aspects of the present invention.

Figure 1:
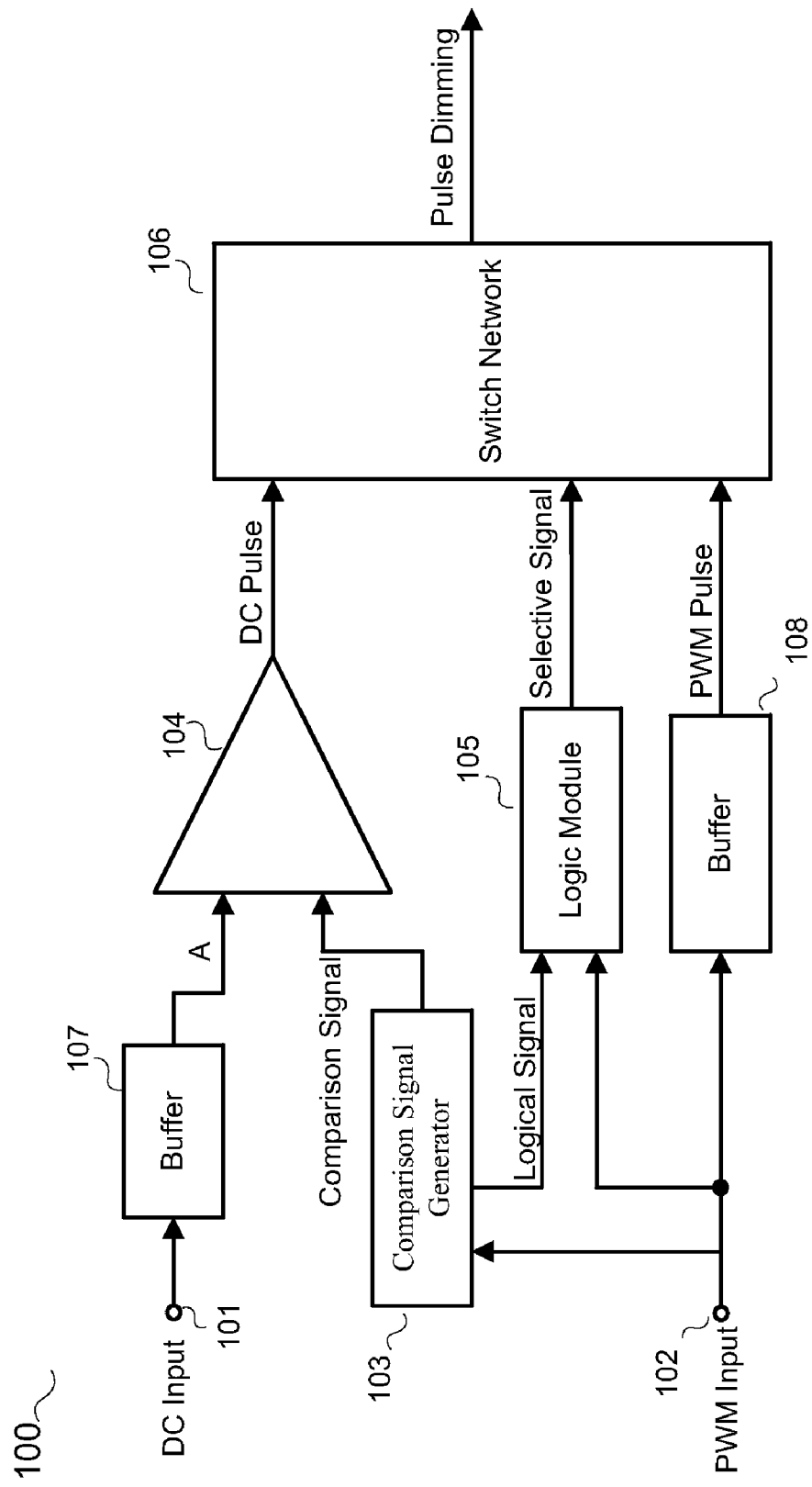
FIG. 1 illustrates a schematic diagram of a pulse dimming circuit 100 in accordance with an embodiment of the present invention.

FIG. 1 shows a schematic diagram of a pulse dimming circuit 100 in accordance with an embodiment of the present invention. The pulse dimming circuit 100 includes: a first input port 101, which optionally receives a DC input signal; a second input port 102, which optionally receives a PWM input signal; a comparison signal generator 103, which is coupled to the second input port 102 for receiving the PWM input signal if provided, and provides a comparison signal and a logical signal accordingly; and a comparator 104, which is coupled to the first input port 101 through a buffer 107 for receiving the DC input signal if provided, coupled to the comparison signal output of the comparison signal generator 103.

The comparator 104 provides a DC pulse signal according to the comparison signal and the DC input signal. The circuit 100 also includes a logic module 105, which is coupled to the second input port 102 for receiving the PWM input signal if provided, and is further coupled to the logical signal output terminal of the comparison signal generator 103. The logic module provides a selective signal accordingly. Finally, a switch network 106, coupled to the output terminal of the comparator 104 and the output terminal of the logic module 105, and coupled to the second input port 102 through buffer 108 for receiving the PWM input signal if the PWM input signal is provided, provides a pulse dimming signal accordingly.

Note that, buffers 107 and 108 are optional. In addition, the first buffer module 107 could be used to regulate the voltage level of the DC input signal, the second buffer module 108 could be used to regulate the voltage level of the PWM input signal. In one embodiment, a PWM pulse signal is generated by processing the PWM input signal via the second buffer module 108. Thereupon, in one embodiment, the switch network 106 receives the PWM pulse signal instead of the PWM input signal.

In one embodiment, the PWM input signal has a higher priority than the DC input signal. When in operation, the comparison signal generator 103 identifies whether the PWM input signal is provided or not. If the PWM input signal is input, the comparison signal has a first status, which is delivered to the comparator 104. Further, the logical signal has a first logic value, i.e., logic "0", which is sent to the logic module 105. As a result, the logic module 105 sends the selective signal with a first status to the switch network 106, so that the switch network 106 operates to provide the pulse dimming signal according to the PWM pulse signal.

In contrast, if the PWM input signal is not input, the comparison signal has a second status, which is compared with the DC input signal at the comparator 104, the comparator 104 provides the DC pulse signal to the switch network 106 accordingly. At the same time, the logical signal has a second logic value, i.e., logic "1", which is sent to the logic module 105. As a result, the logic module 105 sends the selective signal with a second status to the switch network 106, so that the switch network 106 operates to provide the pulse dimming signal according to the DC pulse signal.

In general, the pulse dimming circuit 100 includes the following five operational conditions according to the input signal provided: 1. only PWM input signal is provided; 2. only DC input signal is provided; 3. both PWM input signal and DC input signal are provided; 4. PWM input signal is inserted when DC input is used as the dimming input signal during operation; 5. PWM input signal disappears which is used as the dimming input signal originally, then DC input signal is used as the dimming input signal instead thereafter. The detailed operation mode and principles of the pulse dimming circuit 100 under each condition will be described hereinafter.

During operational conditions 1 and 3, only PWM input signal is provided or both PWM input signal and DC input signal are provided. These two conditions are virtually the same, because the PWM input signal is preset to have a higher priority in one embodiment, and the logic module 105 is preset to output a logic "1" selective signal. As a result, the switch network 106 outputs the pulse dimming signal based on the PWM pulse signal, i.e. the system follows the PWM input signal automatically and produces the pulse dimming signal. For example, when both PWM input signal and DC input signal are provided, the PWM input signal is buffed by the second buffer module 108, then a PWM pulse signal is provided to the switch network 106. Because the PWM input signal is preset to have a higher priority, the logic module 105 will output a logic "1" selective signal to the switch network 106, so that the switch network 106 outputs the pulse dimming signal based on the PWM pulse signal.

Figure 2:
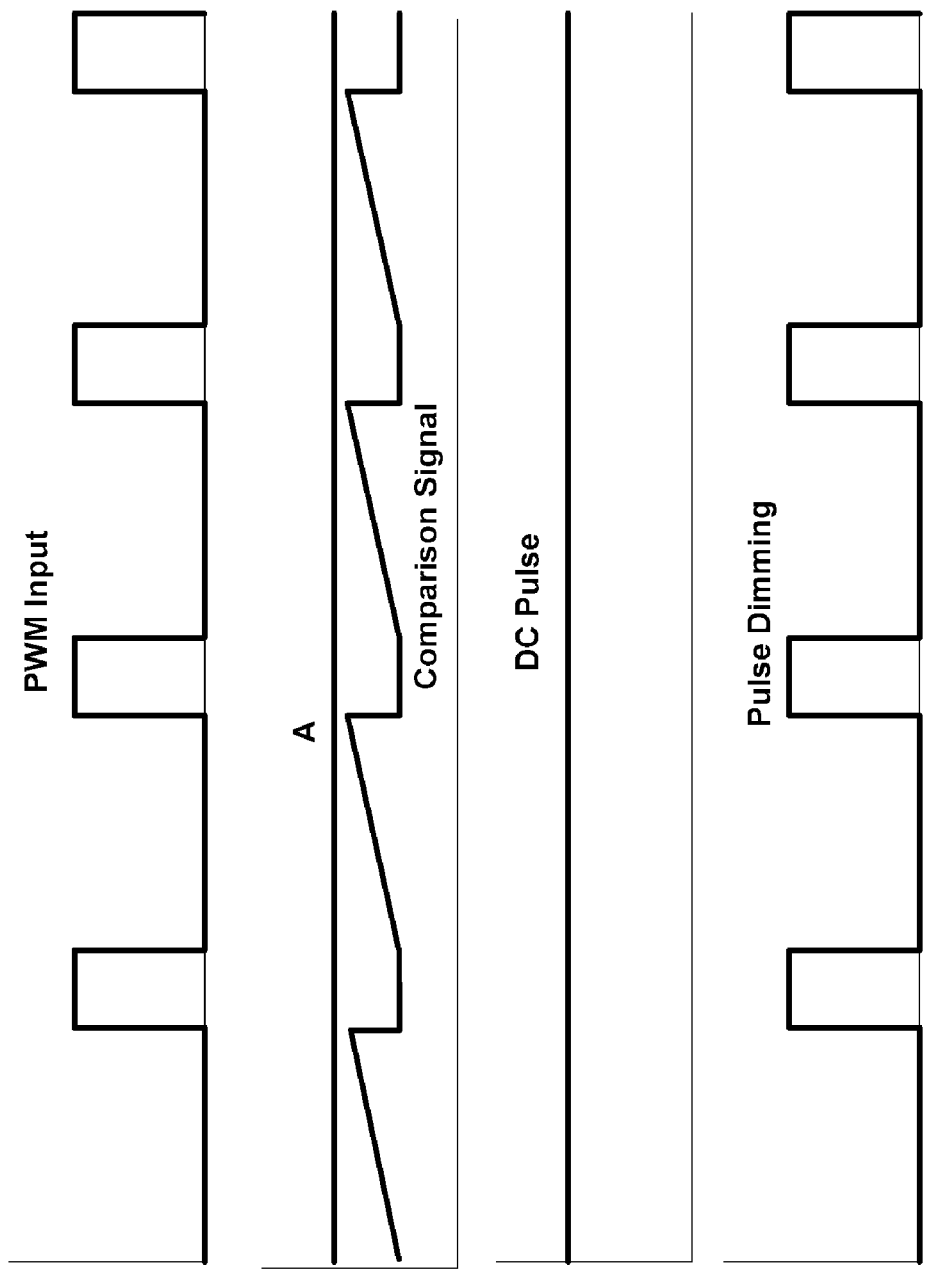
FIG. 2 illustrates a graph of a pulse dimming waveform when both PWM input signal and DC input signal are input in accordance with an embodiment of the present invention.

FIG. 2 is a graph of a pulse dimming waveform when both PWM input signal and DC input signal are input in accordance with an embodiment of the present invention. When the selective signal is logic "1", the system utilizes the PWM input signal. The comparison signal generated by the comparison signal generator 103 has a first status. As shown in FIG. 2, when the PWM input signal is high, the comparison signal is reset. When the PWM input signal is low, the comparison signal generator 103 will be slowly charged up by a relatively small current and outputs the comparison signal rising up at a small rate. When a next rising edge of the PWM input signal comes, the comparison signal is reset. As can be seen from FIG. 2, the comparison signal is comprised by the rising part and reset part. Thus, the comparison signal generator 103 also functions as a detection timer, which detects whether the PWM input signal is constantly provided. The comparison signal generator 103 also provides a logical signal to the logic module 105, wherein the logical signal is a high or low level signal that is produced by comparing the comparison signal with the threshold of the comparison signal generator 103. If the comparison signal is lower than the threshold all the while, the logical signal is logic "0", which is low level. If the comparison signal rises up to the threshold, the logical signal is a narrow pulse. If the PWM input signal is provided all the time, the comparison signal rises up at a relatively small rate and then it is reset. Thus it cannot reach the threshold, and the logical signal is low all the time. The selective signal provided by the logic module 105 will keep logic "1". Thus the switch network 106 will output the pulse dimming signal based on the PWM pulse signal.

Figure 3:
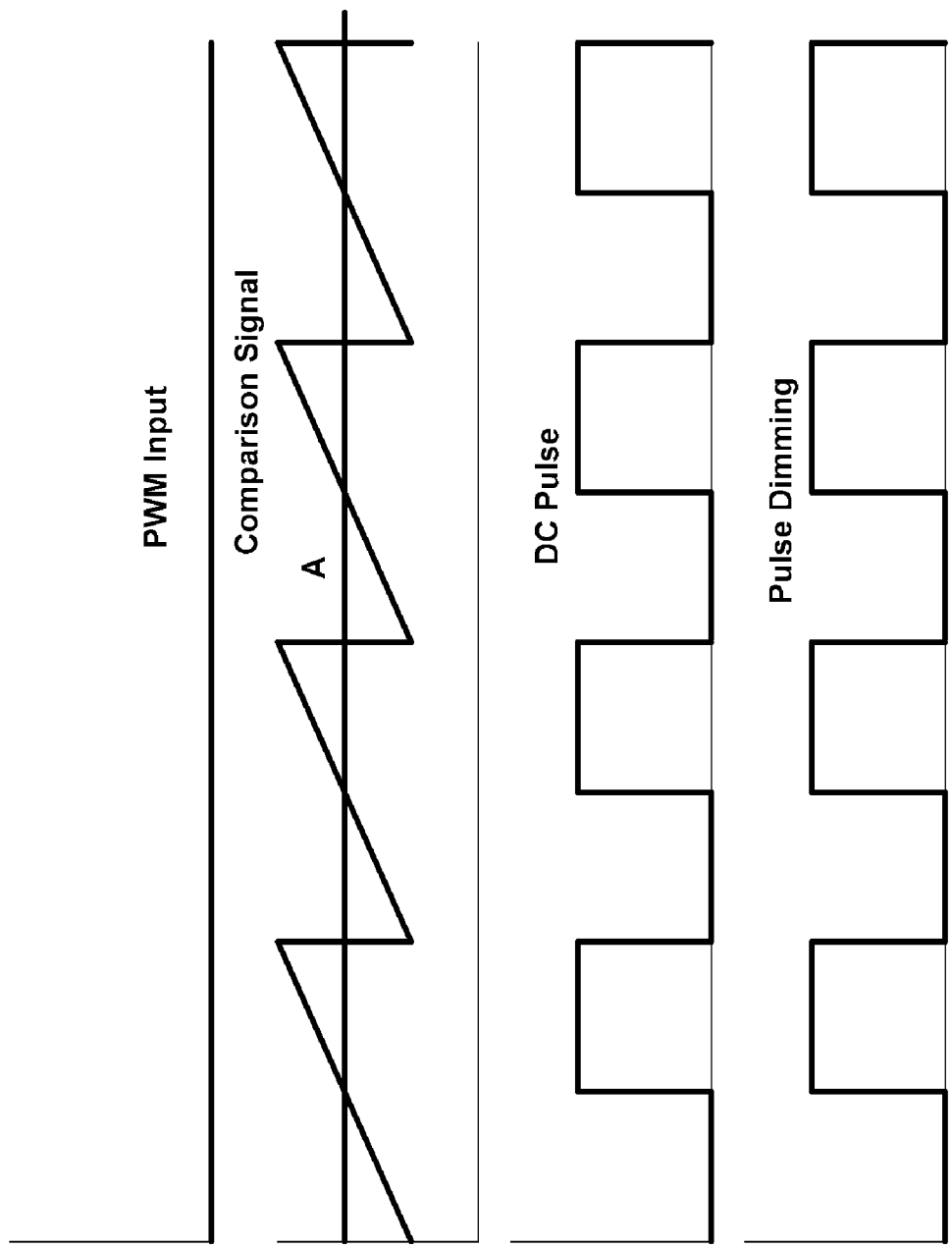
FIG. 3 illustrates a graph of a pulse dimming waveform in operation condition 2 in accordance with an embodiment of the present invention.

Turning to operational condition 2, only DC input signal is provided. FIG. 3 is a graph of pulse dimming waveform when only DC input signal is provided in accordance with an embodiment of the present invention. As shown in FIG. 3, the DC input signal is delivered to one input terminal of the comparator 104 via the first buffer module 107. The comparison signal which is generally a triangular or a sawtooth wave generated from the comparison generator 103, is input to the other input terminal of the comparator 104. After comparison, a DC pulse signal is provided by the comparator 104 and is delivered to the switch network 106. During this operation condition 2, the comparison signal rises up at a normal (relatively greater) rate. The logical signal produced by the comparison signal generator 103 is a narrow pulse (not shown) when the comparison signal rises to be higher than the predetermined threshold. As a result, the logic module 105 outputs a logic "0" selective signal, and the switch network 106 switches to the output terminal of the comparator 104 and output a pulse dimming signal according to the DC pulse signal.

Figure 4:
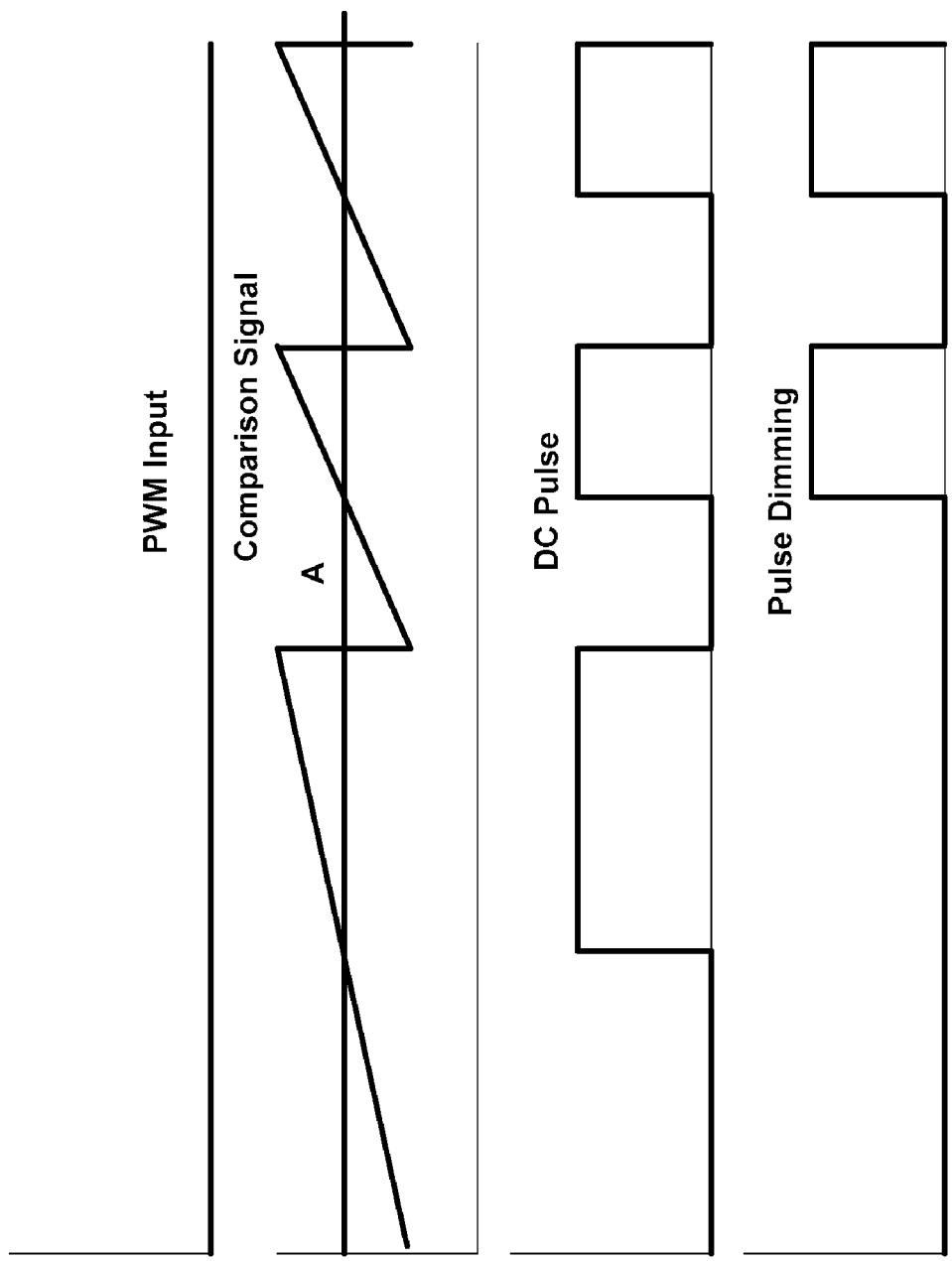
FIG. 4 illustrates a graph of a pulse dimming waveform at the beginning of operation condition 2 in accordance with an embodiment of the present invention.

It should be noted that at the beginning of operation condition 2, there might be a transition from PWM input signal to DC input signal, since the selective signal is predetermined to be logic "1" since the PWM input signal has a higher priority. FIG. 4 illustrates pulse dimming waveform when started utilizing the DC input signal, in accordance with an embodiment of the present invention. As shown in FIG. 4, there is no PWM input signal at the second input terminal 102. However, due to the preset higher priority of the PWM input signal, it is considered that the PWM input signal is provided at the beginning of the system, and a logic "1" selective signal is provided by the logic module 105. Meanwhile the comparison signal generator 103 is charged up slowly by a relatively small current, and it outputs a comparison signal rising up at a small rate during the first charging cycle. Because the PWM input signal is not input virtually, when the comparison signal is charged up to the threshold, the selective signal output by the logic module 105 will turn to logic "0" according to the high level logical signal and the low level PWM input signal. The DC input signal is then selected as the dimming input signal and delivered to the comparator 104 via the first buffer module 107. Meanwhile the comparison signal generator 104 is charged up by a relatively great current and provides a comparison signal rising up at a normal rate which is generally a triangular wave or a sawtooth wave. The DC pulse signal is output by the comparator 104 to the switch network 106. The switch network 106, which will switch to couple to the output terminal of the comparator 104 according to the logic "0" selective signal, will output a pulse dimming signal according to the DC pulse signal.

Figure 5:
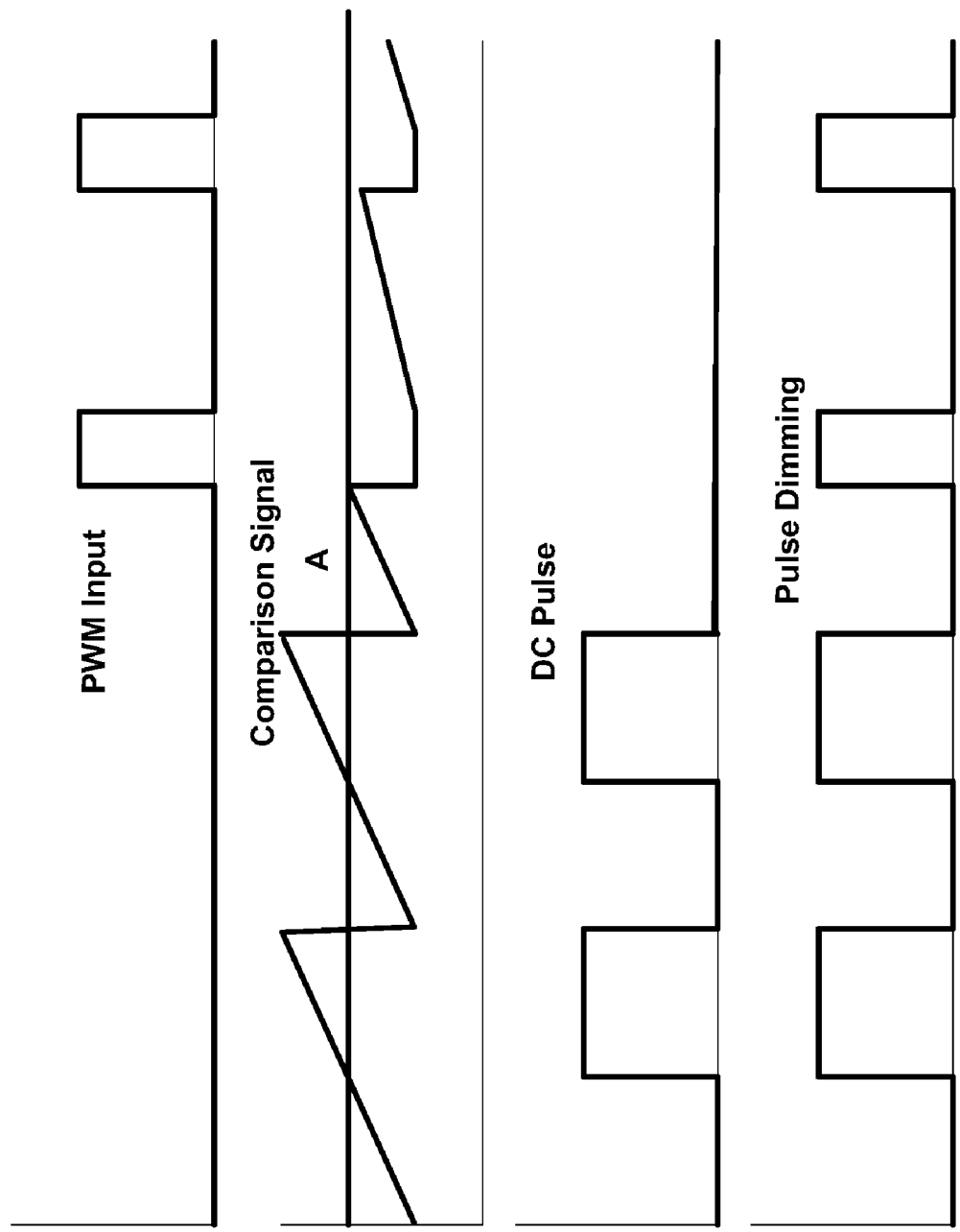
FIG. 5 illustrates a graph of a pulse dimming waveform in operation condition 5 in accordance with an embodiment of the present invention.

Under operational condition 4, the PWM input signal is inserted when DC input is used as the dimming input signal during operation. FIG. 5 is a graph of pulse dimming waveform in operation condition 4 in accordance with an embodiment of the present invention. As shown in FIG. 5, when no PWM input signal is provided, the DC input signal is selected as the dimming input signal, the logic module 105 outputs a logic "0" selective signal. The comparison signal generator 103 outputs a comparison signal that is a triangular wave or sawtooth wave to the comparator 104. The comparator 104 compares the comparison signal with the DC input signal, and outputs a DC pulse signal according to which the switch network 106 provides the pulse dimming signal.

Once the PWM input signal is input, the comparison signal is reset so long as the PWM input signal is high. When PWM input signal is low, the comparison signal generator 103 is charged up slowly by a relatively small current, and the comparison signal is rising up slowly at a relatively small rate until coming of a next rising edge of the PWM input signal. Thus the comparison signal generator 103 is also functions as a detection timer, which detects whether the PWM input signal is provided all the while or not. If the PWM input signal is provided, the selective signal keeps logic "1". The PWM input signal is delivered to the second buffer module 108 where PWM pulse signal is produced. The switch network 106 receives the PWM pulse signal and outputs pulse dimming signal based on the PWM pulse signal. As shown in FIG. 5, during the operation that the DC input signal is selected as dimming input signal, once the PWM input signal is inserted, the pulse dimming signal will immediately follow the PWM input signal. Thus, the pulse dimming circuit 100 achieves a self-adapting switching from DC input signal to PWM input signal.

Figure 6:
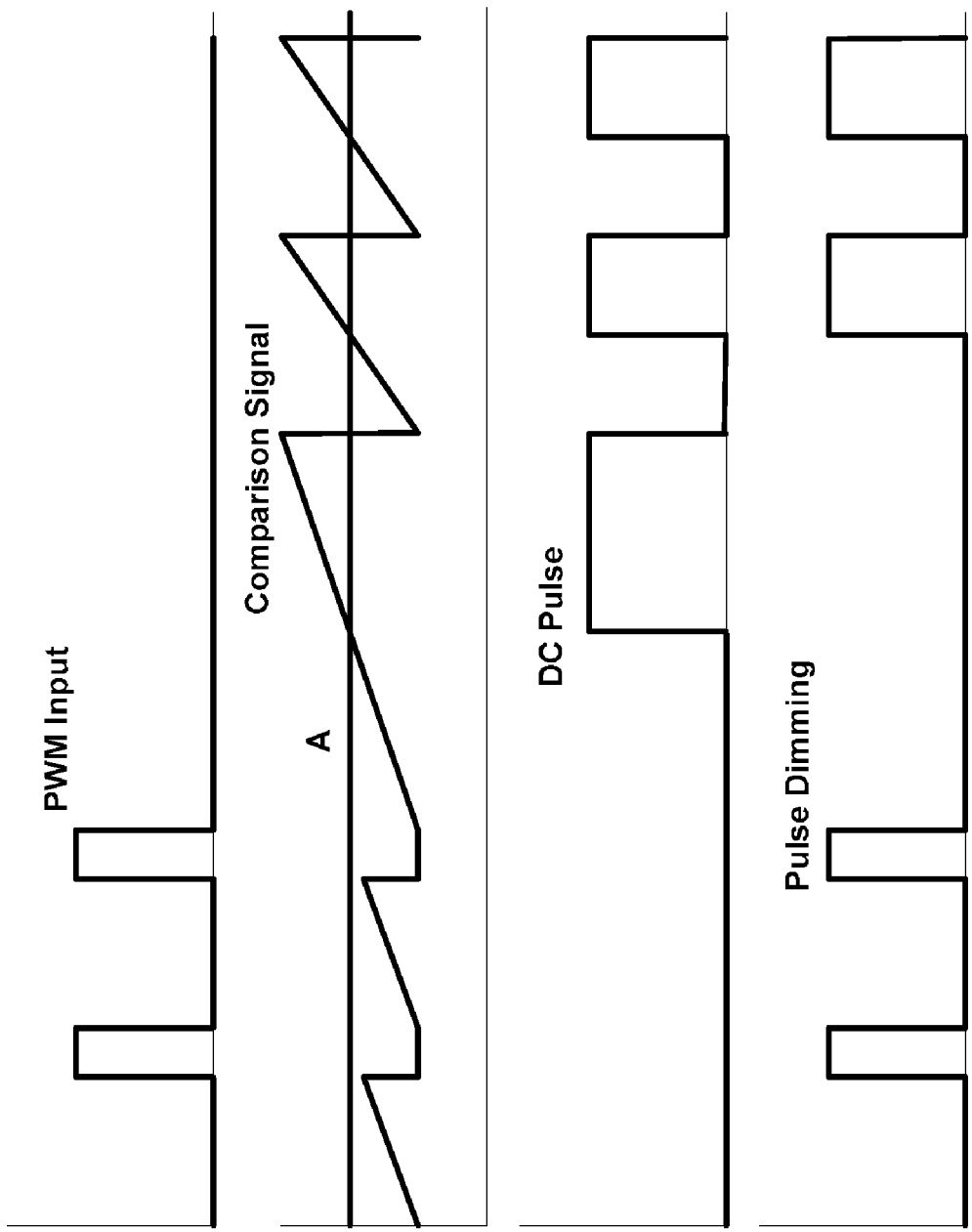
FIG. 6 illustrates a graph of a pulse dimming waveform in operation condition 5 in accordance with an embodiment of the present invention.

Operation condition 5: the PWM input signal disappears which is used as the dimming input signal originally, then the DC input signal is used as the dimming input signal instead. FIG. 6 shows the pulse dimming waveform in operation condition 5 in accordance with an embodiment of the present invention. As shown in FIG. 6, when PWM input signal is provided as dimming input signal, the logic module 105 outputs a logic "1" selective signal and the comparison signal generator functions as a detection timer. When the PWM input signal is high, the comparison signal is reset. When the PWM input signal turns to low, the comparison signal generator 103 is charged up slowly by a relatively small current, and the comparison signal rises up slowly at a relatively small rate. The comparison signal generator 103 is not reset until coming of a next rising edge of the PWM input signal.

As illustrated hereinbefore, the pulse dimming signal follows the PWM input signal. However, if the PWM input signal disappears, i.e. the PWM input signal keeps low for a long interval, the comparison signal generator 103 will be charged up by a relatively great current to the threshold. And a comparison signal rising up at a normal rate is output. The comparison signal is generally a triangular wave or sawtooth wave, which is sent to the comparator 104. At one hand, the DC input signal is selected as the dimming input signal and is delivered to the comparator 104 via the first buffer module 107. The DC pulse signal is then provided by the comparator 104, and is sent to the switch network 106. At the other hand, the logical signal is high and the PWM input signal is low, thus a logic "0" selective signal is output by the logic module 105. As a result, the switch network 106 will choose to switch to the output terminal of the comparator 104 according to the logic "0" selective signal and a pulse dimming signal based on the DC pulse signal is produced. Therefore, the dimming circuit 100 achieves self-adapting switch to DC input signal when the PWM input signal disappears.

Figure 7:
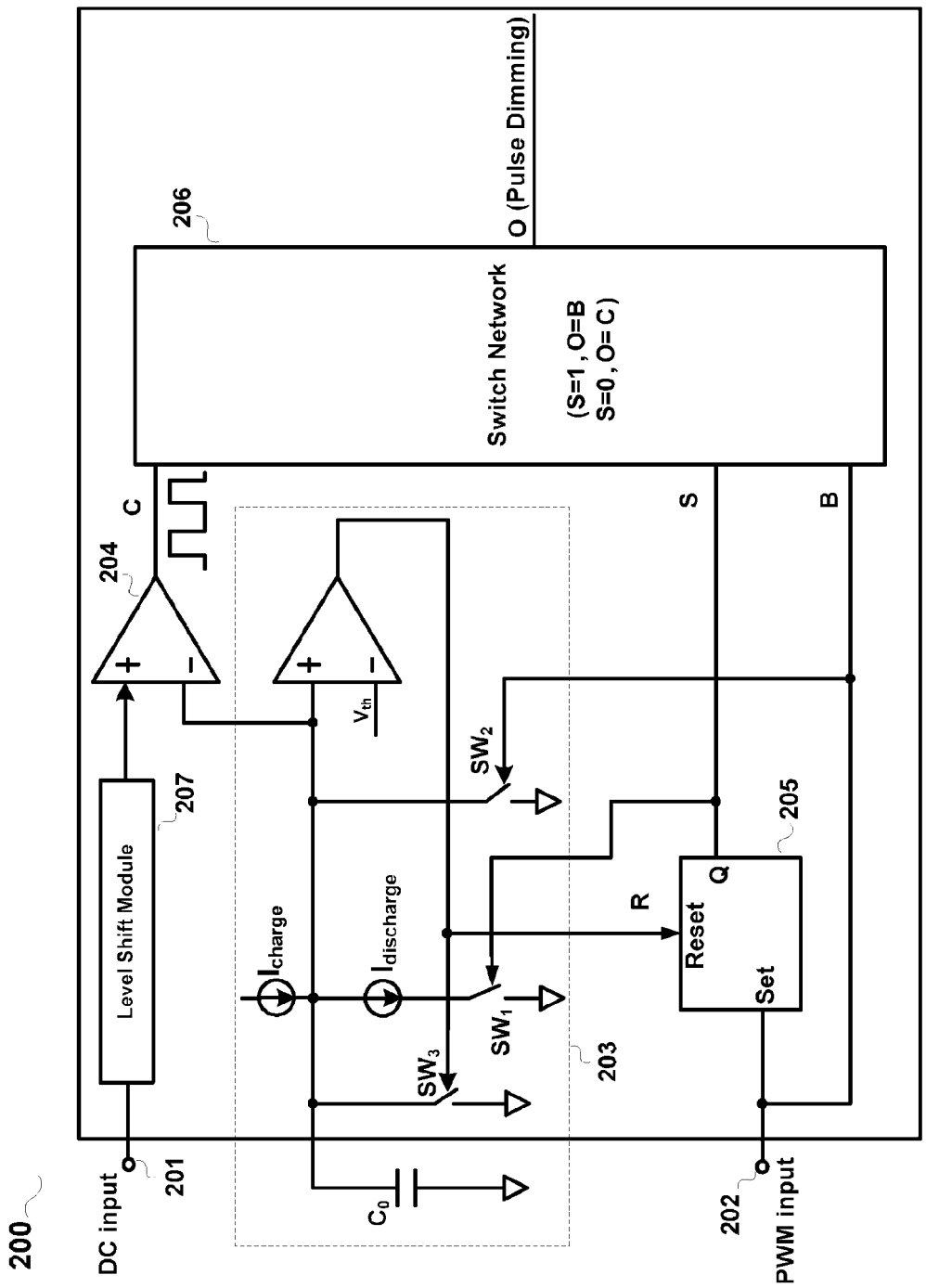
FIG. 7 illustrates a schematic diagram of pulse dimming integrated circuit 200 in accordance with another embodiment of the present invention.

FIG. 7 is a schematic diagram of a pulse dimming integrated circuit 200 in accordance with another embodiment of the present invention.

In one embodiment, the logic module is implemented by a RS Flip-Flop 205. The comparison signal generator 203 comprises a second comparator, a charge current source Icharge, a discharge current source Idischarge, a capacitor C0, a first switch SW1, a second switch SW2, and a third switch SW3. The charge current source Icharge, the discharge current source Idischarge, and the first switch SW1 are coupled in series, the common coupled terminal of the charge current source Icharge and the discharge current source Idischarge is coupled to the non-inverting input terminal of the second comparator. The second switch SW2, the third switch SW3, and the capacitor C0 are coupled in parallel between the non-inverting input terminal of the second comparator and ground. The control terminal of the first switch SW1 is coupled to the output terminal Q of the RS Flip-Flop 205, the control terminal of the second switch SW2 is coupled to the second input port 202, the control terminal of the third switch SW3 is coupled to the output terminal of the second comparator, respectively. The second comparator receives a threshold signal Vth at its inverting terminal.

At the beginning, the PWM input signal has a higher priority and a logic "1" selective signal S is output by the RS Flip-Flop 205. The selective signal S turns on the first switch SW1.

As can be seen from FIG. 7, when the selective signal S is logic "1", the first switch SW1 is turned on; when the selective signal S is logic "0", the first switch SW1 is turned off. When the PWM input signal B is high, the second switch SW2 is turned on, the capacitor C0 is reset accordingly; when the PWM input signal B is low, the second switch SW2 is turned off. In the case when the first switch SW1 is turned on, the discharge current source Idischarge is shunted from the charge current source Icharge to ground, only the rest relatively small part of the charge current source Icharge is used to charge the capacitor C0, thus the comparison signal rising up at a relatively small rate until the PWM input signal B turns to high again. And the capacitor C0 is reset. According to the selective signal S, the switch network 206 selects the PWM input signal B as the dimming input signal of the dimming circuit 200. Thus a pulse dimming signal is output based on the PWM input signal B.

When the PWM input signal keeps low for a predetermined time, the second switch SW2 is turned off, the capacitor C0 is charged up till the voltage across it exceed the threshold Vth. Then the second comparator, i.e., the comparison signal generator 203 outputs a high signal R to the reset terminal of RS Flip-Flop. The RS Flip-Flop outputs a logic "0" selective signal S accordingly to turn off the first switch SW1. As a result, the capacitor C0 will be charged up by the current Icharge and the comparison signal generator 203 outputs a comparison signal rising up at a normal rate. Generally the comparison signal is a triangular wave or sawtooth wave and is sent to the inverting terminal of the comparator 204. The non-inverting terminal of the comparator 204 receives a DC input signal or the DC input signal level shifted by a level shift module 207. The comparator 204 provides a DC pulse signal to the switch network 206. The switch network 206 switches to the output terminal of the comparator 204 according to the logic "0" selective signal S and outputs a pulse dimming signal O based on the DC pulse signal C.

In one embodiment, the logic module in the pulse dimming circuit 200 may also be implemented by a D Flip-Flop.

Figure 8:
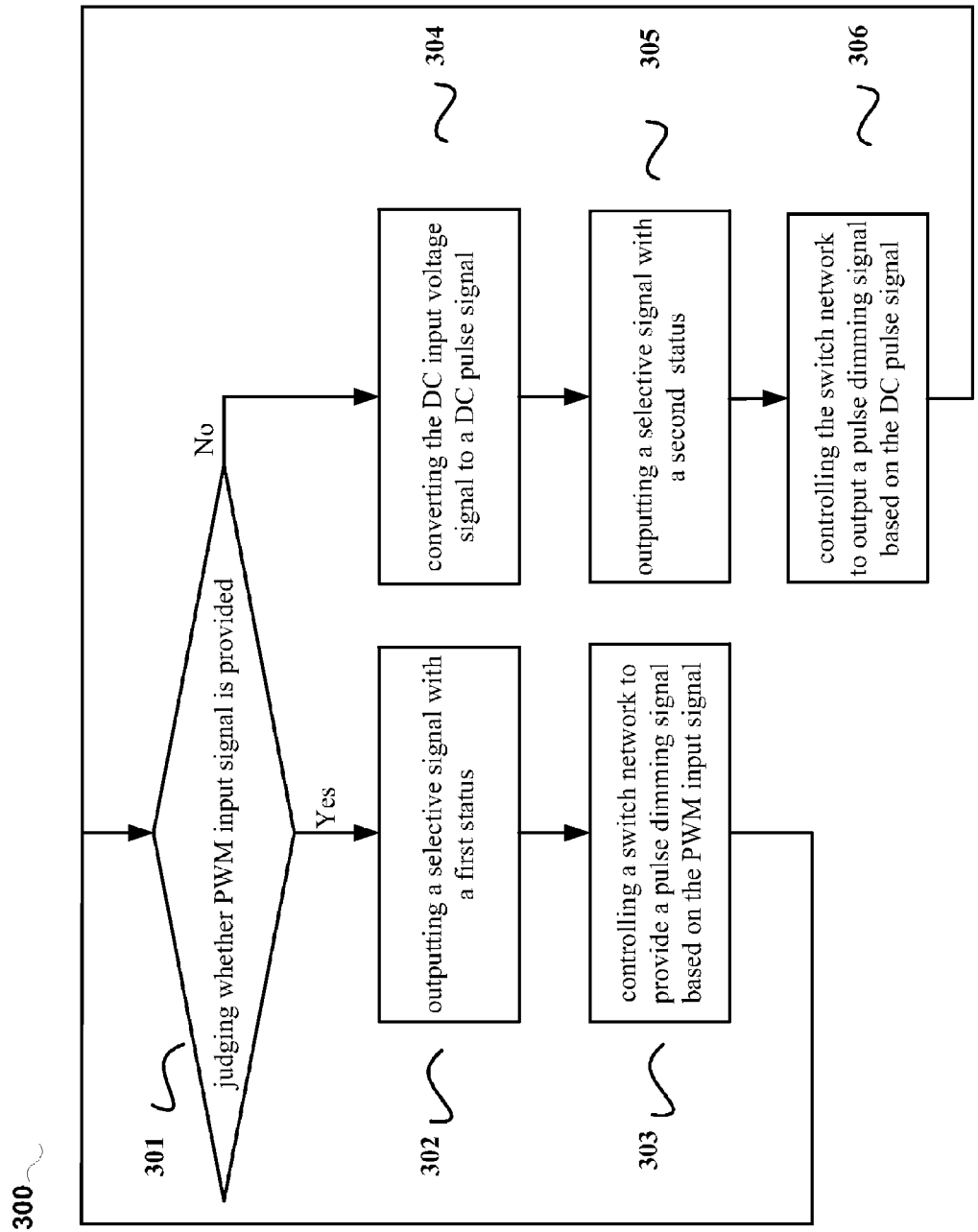
FIG. 8 illustrates a flow chart 300 of a pulse dimming method in accordance with yet another embodiment of the present invention.

FIG. 8 illustrates a flow chart 300 of a pulse dimming method in accordance with yet another embodiment of the present invention. Referring to FIG. 8, the method comprises: process 301, judging whether a PWM input signal is provided, and if provided, jumping to process 302, and if not provided, jumping to process 304. At process 302, a selective signal is output with a first status. At process 303, a switch network is controlled to provide a pulse dimming signal according to the PWM input signal based on the selective signal with a first status.

In one embodiment, at process 302, a comparison signal is provided with a first status, and a logical signal is provided with a first logic value. When the PWM input signal is high, the comparison signal is reset; when the PWM input signal is low, the comparison signal with a first status rises up at a relative low rate. The logical signal with a first logic value is a logic "0" signal; the selective signal with a first status is a logic "1" signal.

If input signal contains DC input voltage signal only, that is, the PWM input signal is not provided, then control goes to process 304 where the DC input voltage signal is converted to a DC pulse signal. At process 305, a selective signal is output with a second status. At process 306, the switch network is controlled to output a pulse dimming signal according to the DC pulse signal based on the selective signal with a second status.

In one embodiment, at process 304, a comparison signal is provided with a second status, and a logical signal is provided with a second logic value. Further, the comparison signal is compared with the DC input signal to get the DC pulse signal. The comparison signal with a second status is a sawtooth or triangular wave, rising up at a relative high rate; the logical signal with a second logic value is a logic "1" signal; the selective signal with a second status is a logic "0" signal.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A pulse dimming circuit, comprising:
a first input port;
a second input port;
a comparison signal generator electrically coupled to the second input port;
a comparator electrically coupled to the first input port and a first output terminal of the comparison signal generator;
a logic module electrically coupled to the second input port and a second output terminal of the comparison signal generator; and
a switch network electrically coupled to the second input port, an output terminal of the comparator, and an output terminal of the logic module.

2. The pulse dimming circuit of claim 1, further comprising a first buffer electrically coupled between the second input port and the input terminal of the switch network.

3. The pulse dimming circuit of claim 2, further comprising a second buffer electrically coupled between the first input port and the input terminal of the comparator.

4. The pulse dimming circuit of claim 1, wherein the logic module is a RS flip-flop.

5. The pulse dimming circuit of claim 1, wherein the logic module is a D flip-flop.

6. The pulse dimming circuit of claim 1, wherein if a PWM input signal is provided at the second input terminal, the comparison signal generator provides a comparison signal with a first status and provides a logical signal with a first logic value, the logic module provides a selective signal with a first status, and the switch network provides a pulse dimming signal based on the PWM input signal.

7. The pulse dimming circuit of claim 6, wherein when the PWM input signal is high, the comparison signal is reset; and when the PWM input signal is low, the comparison signal with a first status rises up at a low rate.

8. The pulse dimming circuit of claim 1, wherein if a DC input signal is provided at the first input terminal, no PWM input signal is provided at the second input signal, the comparison signal generator provides a comparison signal with a second status and provides a logical signal with a second logic value, the logic module provides a selective signal with a second status, and the switch network provides a pulse dimming signal based on the DC input signal.

9. The pulse dimming circuit of claim 8, wherein the comparison signal with a second status is a sawtooth or triangular wave, rising up at a high rate.

10. The pulse dimming circuit of claim 1, wherein the comparison signal generator comprises a second comparator, a charge current source, a discharge current source, a capacitor, a first switch, a second switch, and a third switch, wherein
the charge current source, the discharge current source, and the first switch are coupled in series, and a common coupled terminal of the charge current source and the discharge current source is coupled to the non-inverting input terminal of the second comparator;
the second switch, the third switch, and the capacitor are coupled in parallel between the non-inverting input terminal of the second comparator and ground;
the control terminal of the first switch is coupled to the output terminal of the logic module, the control terminal of the second switch is coupled to the second input port, the control terminal of the third switch is coupled to the output terminal of the second comparator, respectively; and
the second comparator receives a threshold signal at its inverting terminal.

11. A pulse dimming method, comprising a series of processes $S_1$-$S_6$;
process $S_1$: judging whether a PWM input signal is provided, if provided, jumping to process $S_2$, if not provided, jumping to process $S_4$;
process $S_2$: outputting a selective signal with a first status;
process $S_3$: controlling a switch network to provide a pulse dimming signal according to the PWM input signal based on the selective signal with a first status, jumping to process $S_1$;
process $S_4$: converting a DC input signal to a DC pulse signal;
process $S_5$: outputting a selective signal with a second status;
process $S_6$: controlling the switch network to output a pulse dimming signal according to the DC pulse signal based on the selective signal with a second status, jumping to process $S_1$.

12. The pulse dimming method as claim 11, wherein at process S2, providing a comparison signal with a first status and providing a logical signal with a first logic value.

13. The pulse dimming method as claim 12, wherein when the PWM input signal is high, the comparison signal is reset; when the PWM input signal is low, the comparison signal with a first status rises up at a low rate; the logical signal with a first logic value is a logic "0" signal; the selective signal with a first status is a logic "1" signal.

14. The pulse dimming method as claim 11, wherein at process $S_4$, providing a comparison signal with a second status, providing a logical signal with a second logic value, and comparing the comparison signal with the DC input signal to get the DC pulse signal.

15. The pulse dimming method as claim 14, wherein the comparison signal with a second status is a sawtooth or triangular wave, rising up at a relative high rate; the logical signal with a second logic value is a logic "1" signal; the selective signal with a second status is a logic "0" signal.

16. The pulse dimming method as claim 11, wherein the PWM signal is buffered by a buffer.

* * * * *